(12) United States Patent
Heffield

(10) Patent No.: US 10,577,006 B1
(45) Date of Patent: Mar. 3, 2020

(54) STORAGE AND TRANSPORTATION CART FOR FOLDING CHAIRS AND FOLDING TABLES

(71) Applicant: Stephen Ronald Heffield, Orlando, FL (US)

(72) Inventor: Stephen Ronald Heffield, Orlando, FL (US)

( * ) Notice: Subject to any disclaimer, the term of this patent is extended or adjusted under 35 U.S.C. 154(b) by 0 days.

(21) Appl. No.: 16/557,778

(22) Filed: Aug. 30, 2019

Related U.S. Application Data

(63) Continuation-in-part of application No. 29/700,173, filed on Jul. 31, 2019.

(51) Int. Cl.
| | |
|---|---|
| *B62B 3/00* | (2006.01) |
| *B62B 3/10* | (2006.01) |
| *B62B 3/02* | (2006.01) |
| *B62B 5/06* | (2006.01) |
| *B62B 3/04* | (2006.01) |

(52) U.S. Cl.
CPC .............. *B62B 3/108* (2013.01); *B62B 3/005* (2013.01); *B62B 3/02* (2013.01); *B62B 3/04* (2013.01); *B62B 5/067* (2013.01); *B62B 2202/32* (2013.01); *B62B 2301/044* (2013.01)

(58) Field of Classification Search
CPC ......... B62B 3/108; B62B 3/005; B62B 3/004; B62B 3/02; B62B 3/00
See application file for complete search history.

(56) References Cited

U.S. PATENT DOCUMENTS

| | | | | |
|---|---|---|---|---|
| 819,053 | A | | 5/1906 | Firestone |
| 1,912,864 | A | | 6/1933 | Stannard |
| 2,070,095 | A | * | 2/1937 | Shepard, Jr. .............. B62B 3/00 280/47.16 |
| 2,572,355 | A | | 10/1951 | Kintz |
| 2,621,815 | A | | 12/1952 | Gannon |
| 3,131,829 | A | * | 5/1964 | Masser .............. B65D 21/0204 206/144 |
| 3,338,452 | A | * | 8/1967 | Oakley .............. H01M 2/0245 220/23.4 |
| 3,423,101 | A | * | 1/1969 | Boeye ................ B65D 88/522 280/46 |
| 3,712,638 | A | | 1/1973 | Lipinsky |
| 3,889,814 | A | | 6/1975 | Rice |
| 4,060,252 | A | * | 11/1977 | Mowery ................ B65D 19/42 280/79.11 |

(Continued)

*Primary Examiner* — Hau V Phan

(57) ABSTRACT

A storage and transportation car for folding chairs and folding tables is an apparatus that stores and transports folding chairs and folding tables. The apparatus includes a platform, a plurality of first cleats and a plurality of second cleats. The platform includes an elongated base panel that upholds both the chairs and tables from the ground. The frame connects the plurality of first cleats and the plurality of second cleats with the platform. The plurality of first cleats and the plurality of second cleats position the chairs and tables across the platform. A plurality of first sockets and a plurality of second sockets are defined between the plurality of first cleats and the plurality of second cleats, respectively. The plurality of first sockets and the plurality of second sockets orients each chair. The plurality of first cleats and the plurality of second cleats upholds the legs of each chair.

19 Claims, 6 Drawing Sheets

(56) References Cited

U.S. PATENT DOCUMENTS

| | | | | |
|---|---|---|---|---|
| 5,299,817 | A * | 4/1994 | Chang | B62B 5/0083 280/35 |
| 6,024,376 | A * | 2/2000 | Golichowski | B62B 3/022 16/35 R |
| 6,454,282 | B2 * | 9/2002 | Sexton | B62B 3/108 211/41.1 |
| 6,550,794 | B1 * | 4/2003 | Spindel | B60D 1/00 280/33.993 |
| 6,923,606 | B2 * | 8/2005 | Fehrle | A61G 1/06 211/173 |
| 7,588,257 | B2 * | 9/2009 | Gu | B62B 3/16 280/32.6 |
| 8,827,305 | B2 * | 9/2014 | Saito | B62B 5/067 280/655.1 |
| 8,851,488 | B2 * | 10/2014 | Carruyo | B60P 7/08 280/79.11 |
| 9,561,815 | B2 * | 2/2017 | Choi | B62B 5/06 |
| 2009/0057245 | A1 | 3/2009 | Hinckley | |
| 2012/0018966 | A1 * | 1/2012 | Moore | B62B 3/002 280/79.11 |
| 2013/0200585 | A1 * | 8/2013 | Hoeper | B62B 3/004 280/79.2 |
| 2016/0009132 | A1 * | 1/2016 | Spektor | B60B 33/0076 280/79.11 |

\* cited by examiner

STORAGE AND TRANSPORTATION CART FOR FOLDING CHAIRS AND FOLDING TABLES

FIELD OF THE INVENTION

The present invention generally relates to carts. More specifically, the present invention is a storage and transportation cart for folding chairs and folding tables.

BACKGROUND OF THE INVENTION

Folding chairs and folding tables are typically used for events with numerous guests. Therefore, storage and transportation of multiple folding chairs and folding tables can be difficult and time consuming. When stacked against a wall, especially on a tile or slippery floor, the feet of both the folding chairs and the folding tables slide out, and the entire stack clatters into disarray. This is also the case for typical carts with frames to keep folding chairs and folding tables from unraveling.

It is therefore an objective of the present invention to secure a position for the feet of folding chairs and orient the feet so that folding chairs may be stored in an organized manner. Both folding chairs and folding tables are able to independently stand with the present invention such that simply taking out one folding table or folding chair does not disturb the remaining folding chairs and tables. The present invention is also easily maneuverable and easily positioned within a closet or storage unit.

DETAILED DESCRIPTION OF THE INVENTION

Figure 1:
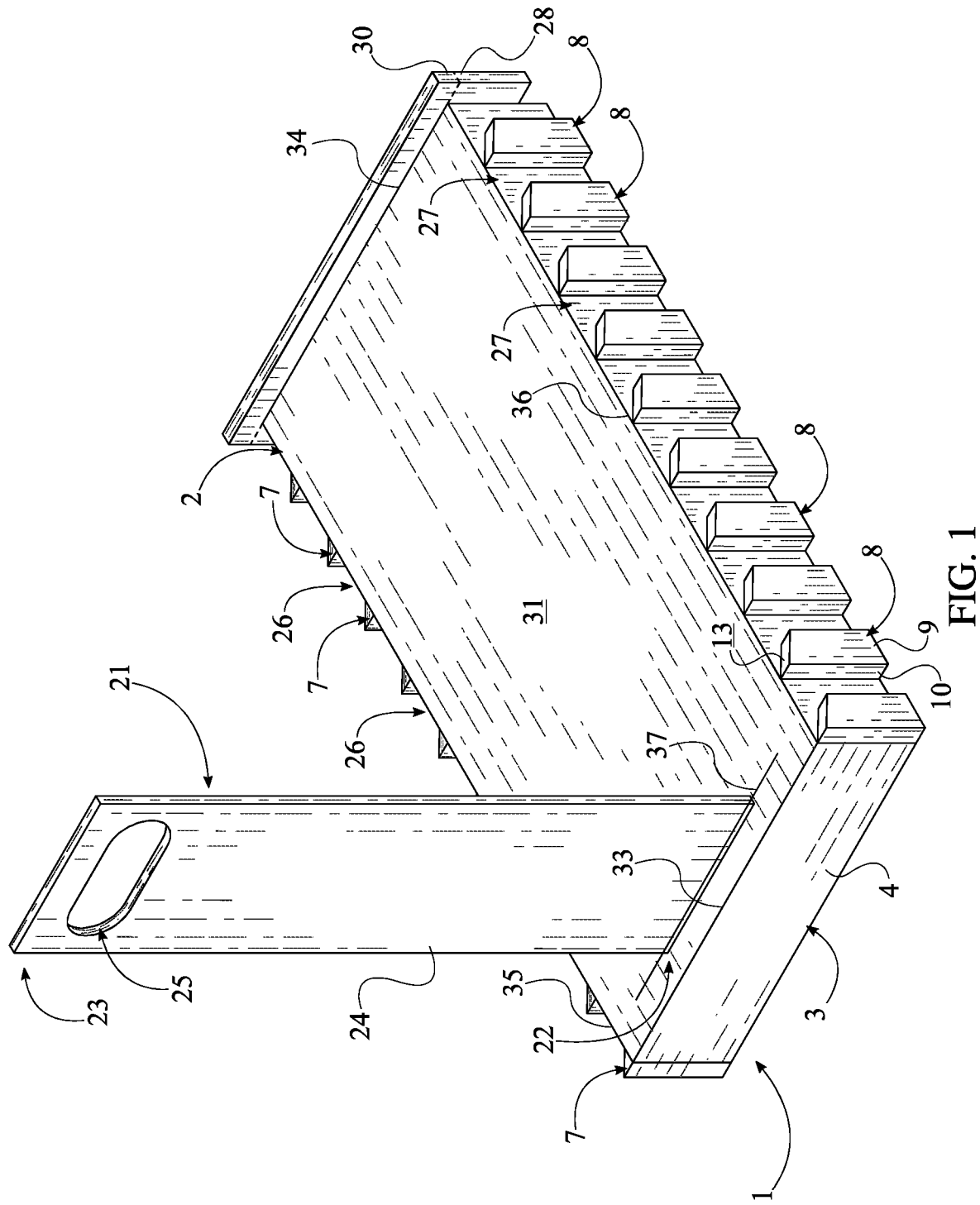
FIG. 1 is a perspective view of the present invention in an expanded configuration.

All illustrations of the drawings are for the purpose of describing selected versions of the present invention and are not intended to limit the scope of the present invention.

The present invention is a storage and transportation cart for folding chairs and folding tables. The present invention upholds each folding chair and each folding table in an upright position independently of one another. The present invention stores a plurality of folding chairs and a plurality of folding tables in an efficient and compact arrangement so that the present invention with the plurality of folding chairs and the plurality of folding tables are easily maneuvered and positioned within a closet or storage unit. In order for the present invention to securely store a plurality of folding chairs and folding tables, the present invention comprises a platform 1, a plurality of first cleats 7, a plurality of second cleats 8, a plurality of wheels 17, and an extended handle 21, seen in FIG. 1 and FIG. 2. The platform 1 uplifts the plurality of chairs and the plurality of tables from the ground. The platform 1 comprises an elongated base panel 2 and a frame 3 in order to structurally support the plurality of folding chairs and the plurality of folding tables. The elongated base panel 2 upholds the plurality of folding chairs and the plurality of folding tables, and the frame 3 connects the plurality of first cleats 7 and the plurality of second cleats 8 with the elongated base panel 2. The plurality of first cleats 7 and the plurality of second cleats 8 offsets each folding chair from each other. More specifically, the plurality of first cleats 7 and the plurality of second cleats 8 orient the plurality of folding chairs in an upright manner. The plurality of wheels 17 allows the platform 1 to move across the ground and turn in any direction. The extended handle 21 allows the platform 1 to be maneuvered without grasping onto or disturbing the plurality of chairs and the plurality of tables positioned onto the platform 1, between the plurality of first cleats 7 and the plurality of second cleats 8. The platform 1, the plurality of first cleats 7, the plurality of second cleats 8, and the extended handle 21 preferably made of a wood material. However, alternate embodiments of the present invention may comprise various materials that are equally structurally sound.

The overall configuration of the aforementioned components stabilizes each folding chair and each folding table while in storage and throughout transport. The frame 3 is positioned adjacent to a second panel face 32 of the elongated base panel 2 and perimetrically fixed around the elongated base panel 2, seen in FIG. 5. A first panel face 31 of the elongated base panel 2 is positioned opposite to the second panel face 32. This arrangement positions the plurality of first cleats 7 and the plurality of second cleats 8 with the elongated base panel 2 and allows the plurality of wheels 17 to freely roll and pivot beneath the elongated base panel 2. The plurality of first cleats 7 and the plurality of second cleats 8 are positioned opposite each other about the frame 3 in order for the legs of each folding chair to be engaged by the plurality of first cleats 7 and the plurality of second cleats 8. More specifically, the plurality of first cleats 7 and the plurality of second cleats 8 are externally positioned to the frame 3, so that the plurality of folding chairs and the plurality of folding tables traverse across the platform 1 and the legs of the folding chairs are positioned between adjacent cleats from the plurality of first cleats 7 and corresponding cleats of the plurality of second cleats 8. The plurality of first cleats 7 and the plurality of second cleats 8 are laterally mounted to the frame 3, efficiently organizing and securely storing the plurality of folding chairs and the plurality of folding tables. While the plurality of folding chairs and the plurality of folding tables are stored with the platform 1, the plurality of first cleats 7, and the plurality of second cleats 8, the plurality of wheels 17 freely rolls and turns as the plurality of wheels 17 is mounted onto the second panel face 32. The extended handle 21 is easily accessible by a user as the extended handle 21 is hingedly mounted onto the first panel face 31.

Figure 2:
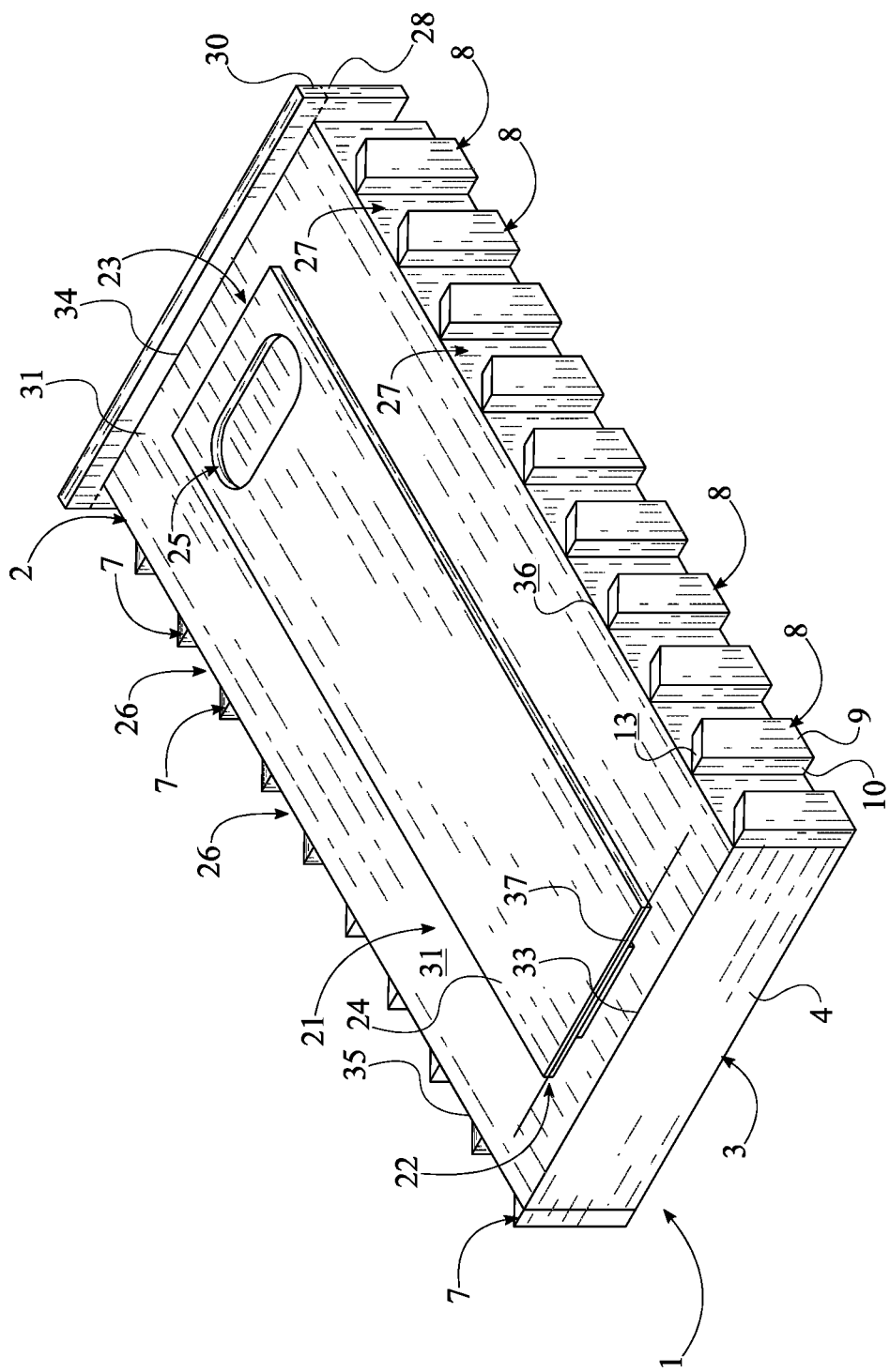
FIG. 2 is a perspective view of the present invention in a retracted configuration.
Figure 3:
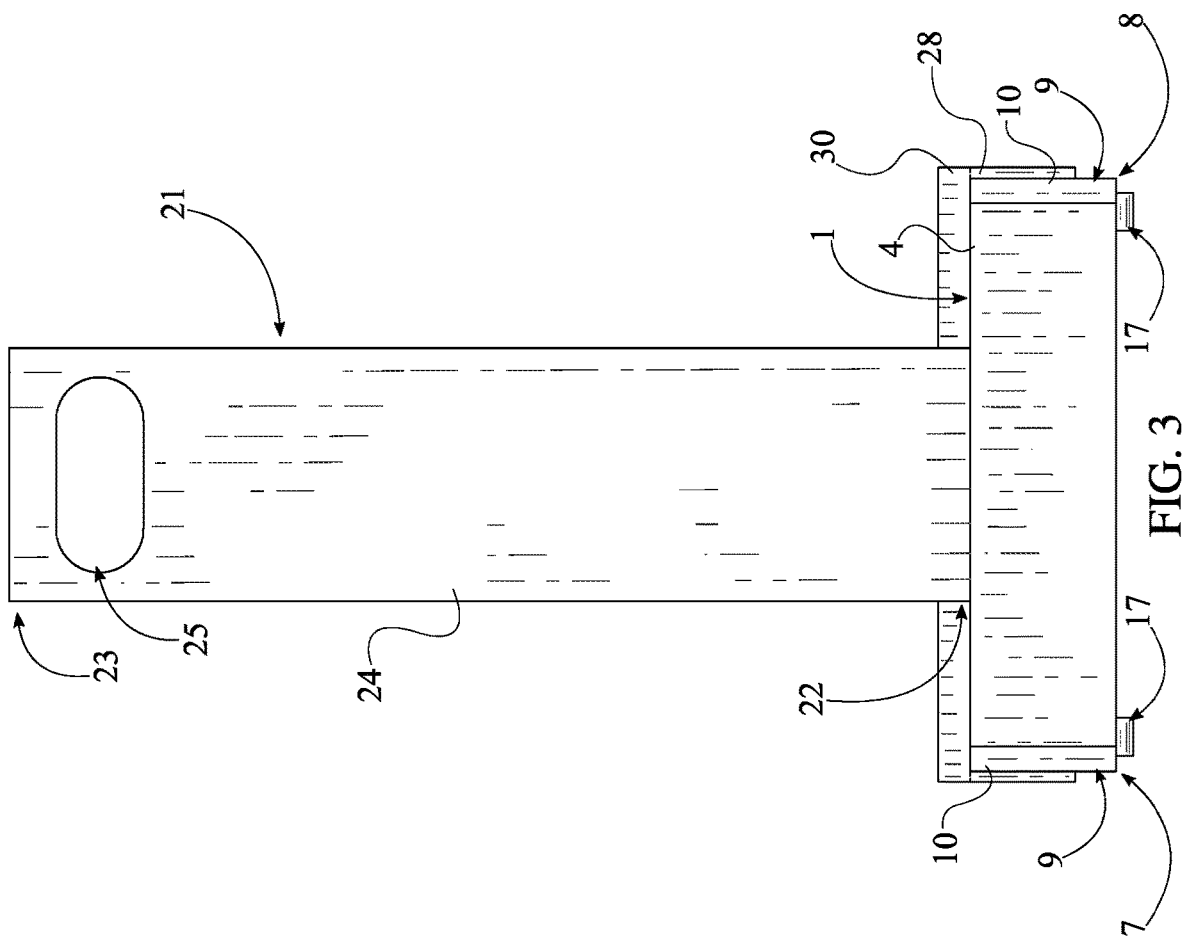
FIG. 3 is a front side view of the present invention in the expanded configuration.

In order for the platform 1 to be maneuvered easily with the weight of the plurality of folding chairs and the plurality of folding tables, a fixed end 22 of the extended handle 21 is positioned adjacent to a first widthwise edge 33 of the elongated base panel 2, seen in FIG. 1 and FIG. 2. Moreover, the first widthwise edge 33 is positioned between the plurality of first cleats 7 and the plurality of second cleats 8. This arrangement limits the swaying of the plurality of folding chairs and the plurality of folding tables throughout transportation. The present invention allows the user to adjust their leverage on the extended handle 21 as a rotation axis 37 of the hinged connection between the extended handle 21 and the elongated base panel 2 is positioned parallel to the first widthwise edge 33.

Figure 4:
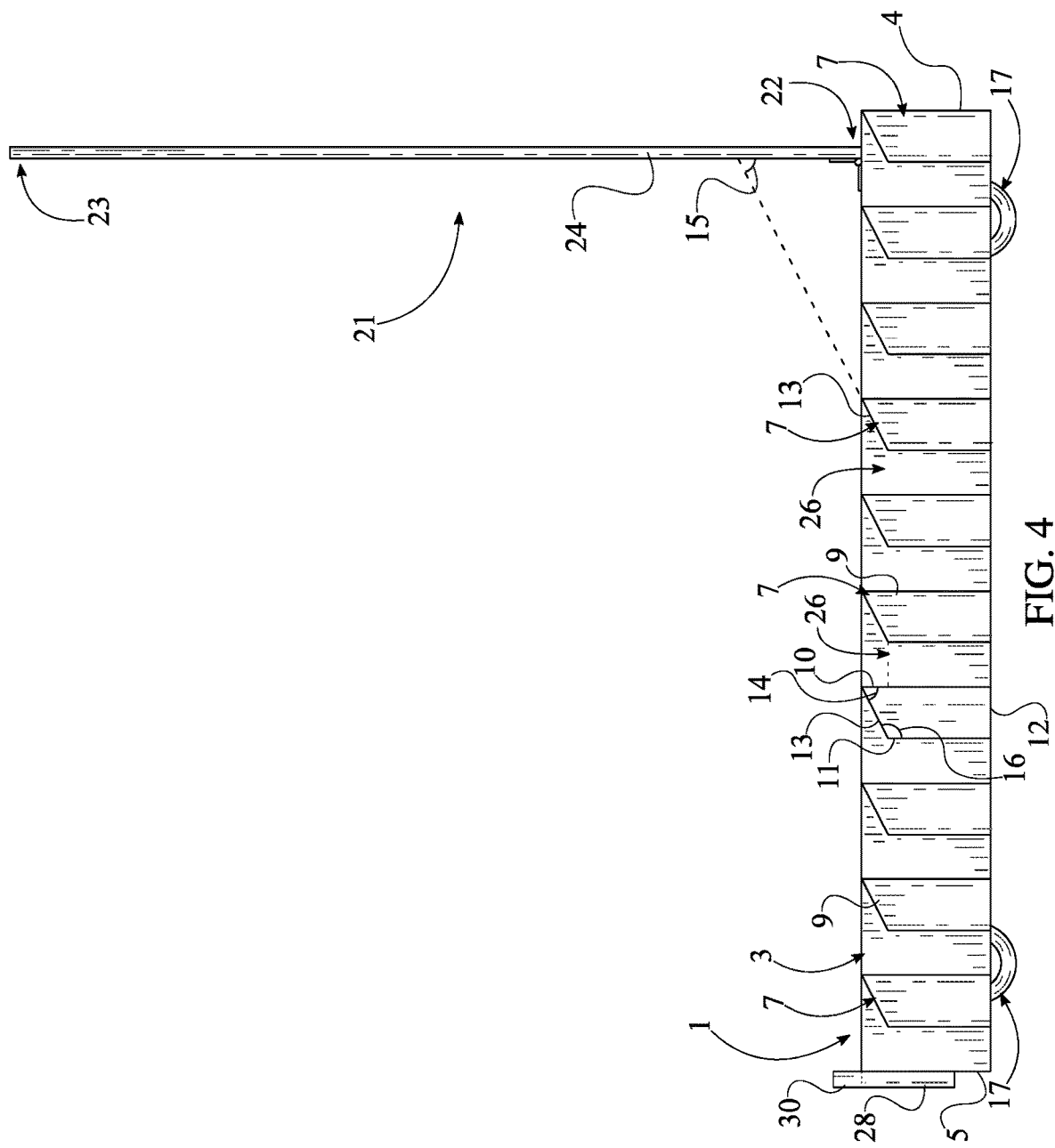
FIG. 4 is a left side view of the present invention in the expanded configuration.

The plurality of folding chairs is further secured by the plurality of first cleats 7 and the plurality of second cleats 8 as a plurality of first sockets 26 is configured in between a corresponding pair of cleats from the plurality of first cleats 7, seen in FIG. 4. Similarly, a plurality of second sockets 27 is configured in between a corresponding pair of cleats from the plurality of second cleats 8 from the plurality of second cleats 8, seen in FIG. 5. Each rear leg of a folding chair is positioned in between a first socket of the plurality of first sockets 26 and a second socket of the plurality of second sockets 27 positioned opposite the corresponding first socket. Simultaneously, each front leg of a folding chair rests on a first cleat of the plurality of first cleats 7 positioned adjacent the corresponding first socket and a second cleat of the plurality of second cleats 8 positioned adjacent the corresponding second socket. This arrangement positions each folding chair across the platform 1 and parallel with both the first widthwise edge 33 and the second widthwise edge 34.

Figure 5:
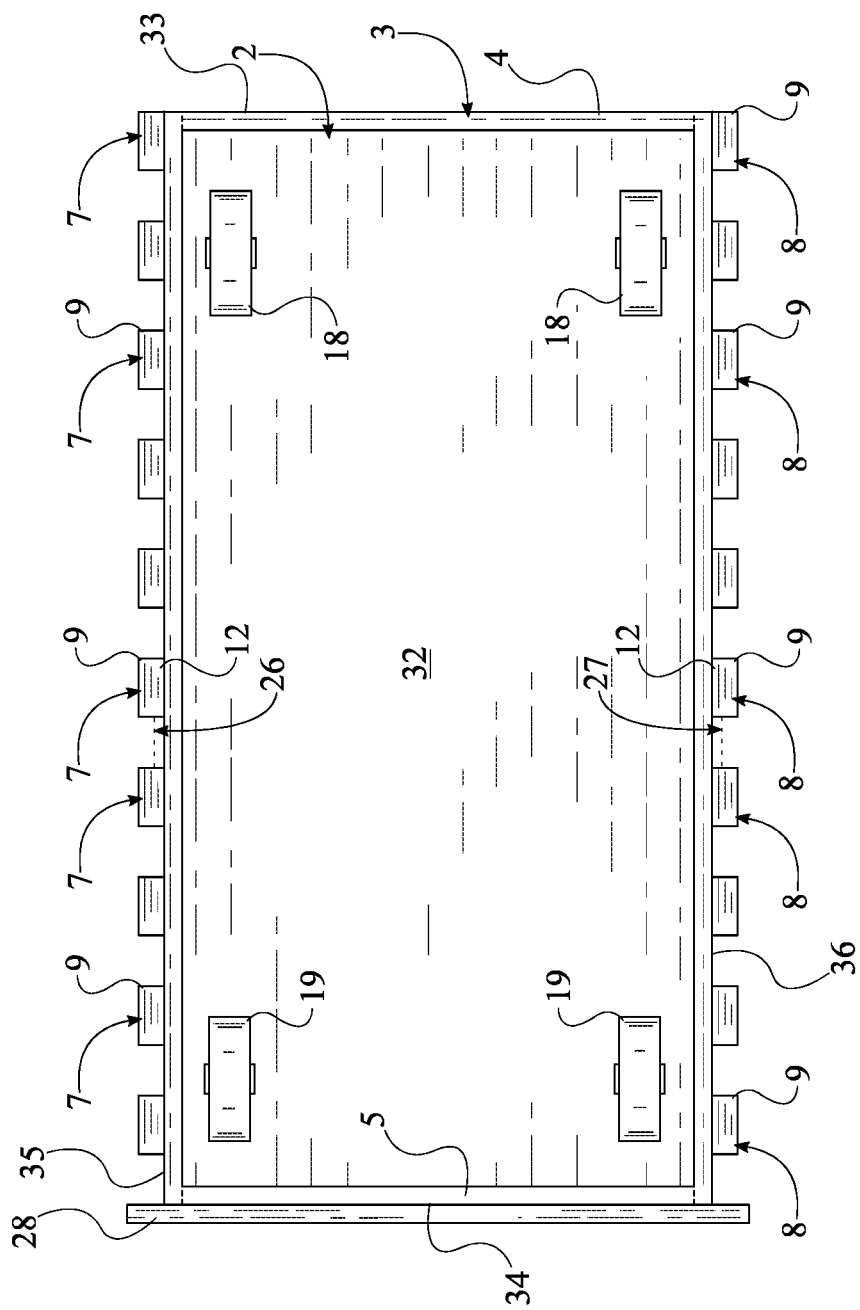
FIG. 5 is a bottom side view of the present invention.
Figure 6:
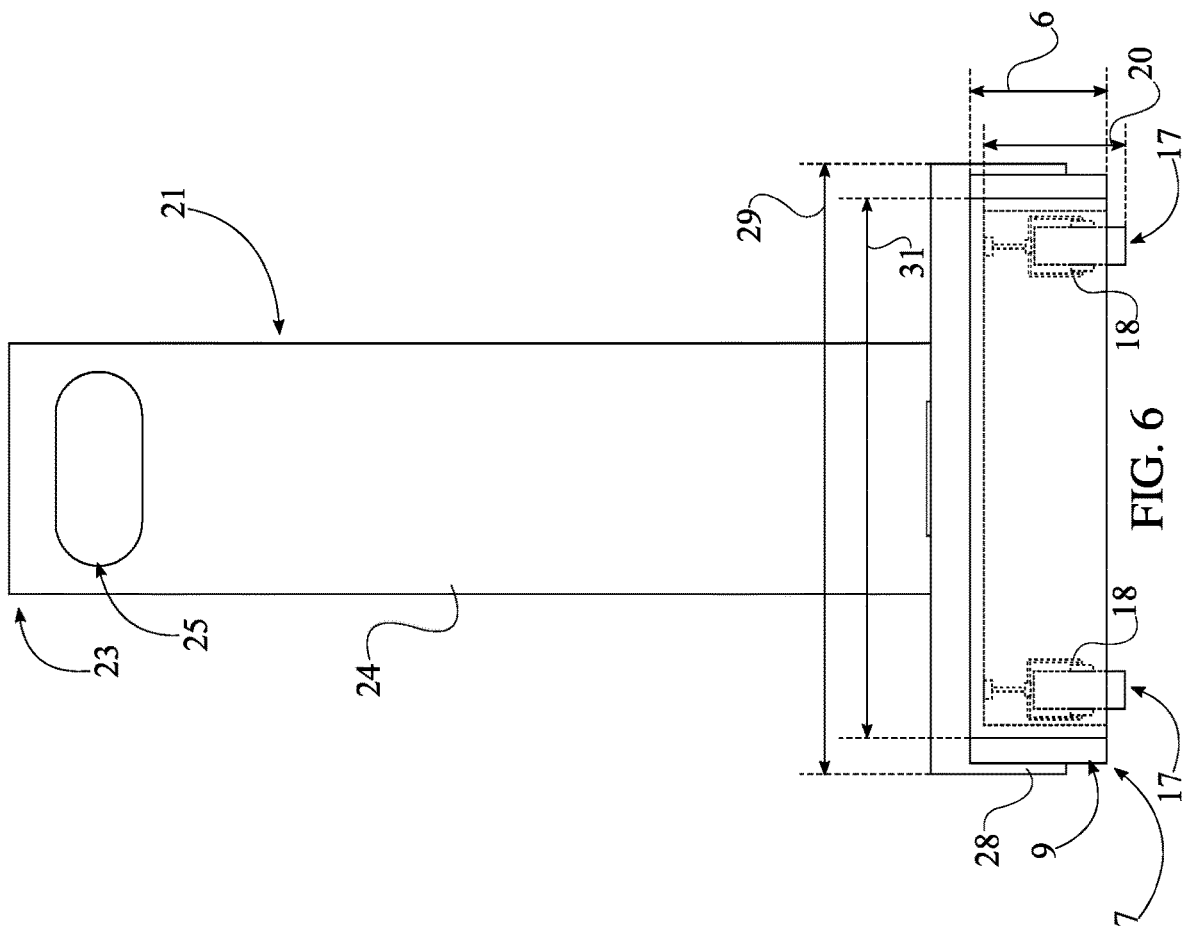
FIG. 6 is a schematic view of a platform, a plurality of wheels, and a stopper plate of the present invention.

In the preferred embodiment of the present invention, the elongated base panel 2 comprises a first widthwise edge 33, a second widthwise edge 34, a first lengthwise edge 35, and a second lengthwise edge 36, seen in FIG. 1, FIG. 2, and FIG. 5. The first widthwise edge 33, the second widthwise edge 34, the first lengthwise edge 35, and the second lengthwise edge 36 is arranged into a rectangular configuration, maximizing the number of folding chairs and folding tables stored with the present invention. More specifically, the plurality of first cleats 7 is distributed along the first lengthwise edge 35. Similarly, the plurality of second cleats 8 is distributed along the second lengthwise edge 36. The distribution of the plurality of first cleats 7 and the plurality of second cleats 8 allows multiple folding chairs to be stored with the present invention. In order to store a folding table with the present invention, at least one folding chair between a couple of folding chairs is removed, and a folding table is positioned between the couple of folding chairs already secured within the plurality of first sockets 26 and the plurality of second sockets 27.

In order for the plurality of folding chairs to be positioned within the plurality of first sockets 26 and the plurality of second sockets 27, while the upright orientation of the plurality of folding chairs remain independently stable, each of the plurality of first cleats 7 and each of the plurality of second cleats 8 each comprise a cleat body 9. More specifically, the cleat body 9 comprises a first lateral surface 10, a second lateral surface 11, a third lateral surface 12, and a fourth lateral surface 13, seen in FIG. 4. The first lateral surface 10, the second lateral surface 11, the third lateral surface 12, and the fourth lateral surface 13 are all oriented perpendicular with the frame 3. This orientation prevents the rear legs of the folding chair from easily sliding past the corresponding first socket of the plurality of first sockets 26 and the corresponding second socket of the plurality of second sockets 27. Moreover, the front legs may securely rest on the corresponding first cleat of the plurality of first cleats 7 and the corresponding second cleat of the plurality of second cleats 8. The first lateral surface 10 and the second lateral surface 11 are positioned opposite each other about the cleat body 9. Similarly, the third lateral surface 12 and the fourth lateral surface 13 are positioned opposite each other about the cleat body 9. The third lateral surface 12 and the fourth lateral surface 13 are positioned in between the first lateral surface 10 and the second lateral surface 11. Moreover, the fourth lateral surface 13 is oriented towards the elongated base panel 2. In order for the rear legs of a folding chair to remain secure within a corresponding first socket and a corresponding second socket, the first lateral surface 10 and the second lateral surface 11 is positioned parallel with each other. More specifically, the third lateral surface 12 is positioned perpendicular with the first lateral surface 10 and the second lateral surface 11. The front legs of a folding chair easily rest on the fourth lateral surface 13 of the cleat body 9, as the fourth lateral surface 13 is oriented at a first acute angle 14 with the first lateral surface 10 and at an obtuse angle 16 with the second lateral surface 11. The fourth lateral surface 13 is consequently tilted so that the plurality of folding chairs smoothly traverses into the plurality of first sockets 26 and the plurality of second sockets 27 while being supported by the plurality of first cleats 7 and the plurality of second cleats 8.

In the preferred embodiment of the present invention, the fourth lateral surface 13 is angled away from the extended handle 21 orienting the rear of each folding chair opposite to the extended handle 21 and facilitating the removal from the present invention and assembly of each folding chair. This orientation is seen in FIG. 4. In this preferred embodiment of the present invention, the frame 3 comprises a first widthwise wall 4 and a second widthwise wall 5. The first widthwise wall 4 and the second widthwise wall 5 are positioned parallel and opposite to each other about the frame 3. This arrangement allows folding chairs to be flushed with the platform 1. The first widthwise wall 4 and the second widthwise wall 5 is positioned perpendicular to the elongated base panel 2. A fixed end 22 of the extended handle 21 is positioned adjacent to the first widthwise wall 4, allowing the platform 1 to be maneuvered from the end of the platform that corresponds with the first widthwise wall 4. Furthermore, in the preferred embodiment of the present invention, the fourth lateral surface 13 is oriented at a second acute angle 15 with the first widthwise wall 4, orienting the front side of the folding chairs towards the extended handle 21.

In order to maintain the structural integrity of the platform 1 while supporting the weight of the plurality of folding chairs and the plurality of folding tables throughout transport, the plurality of wheels 17 comprises a pair of first swivel wheels 18 and a pair of second fixed wheels 19, seen in FIG. 5. The pair of first swivel wheels 18 is positioned adjacent with the first widthwise edge 33. The pair of second fixed wheels 19 is positioned adjacent with the second widthwise edge 34 of the elongated base panel 2. The platform 1 does not tilt along either sides as the pair of first swivel wheels 18 is positioned offset from each other and as the pair of second fixed wheels 19 is positioned offset from each other. In the preferred embodiment of the present invention, the pair of first swivel wheels 18 directs the pair of second fixed wheel 19 with the force from a push or pull of a user as the fixed end 22 of the extended handle 21 is positioned adjacent to the first widthwise edge 33. Furthermore, the platform 1 and the plurality of chairs do not graze or scratch the ground as the platform 1 is elevated from the ground. This is because a circumference 20 for each of the plurality of wheels 17 is greater than a height 6 of the frame 3.

As seen in FIG. 1, FIG. 2, FIG. 3, FIG. 4, and FIG. 6, the present invention further comprises a stopper plate 28 that prevents an adjacent folding chair from falling off the end of the platform 1, the adjacent folding chair is positioned at the end of the platform 1. The stopper plate 28 is positioned adjacent to the second widthwise edge 34 and positioned perpendicular to the elongated base panel 2. Furthermore, the stopper plate 28 is laterally mounted to the frame 3, securing the folding chair positioned at the end of the platform 1, opposite the extended handle 21 with the platform 1. More specifically, a length 29 of the stopper plate 28 is positioned parallel to the second widthwise edge 34 and is longer than the second widthwise edge 34. This arrangement allows the rear legs of a folding chair remains secure within a first socket of the plurality of first sockets 26 and a second socket of the plurality of second sockets 27 that are positioned adjacent the stopper plate 29. In order to reinforce the orientation of the remaining plurality of folding chairs positioned on the platform 1 throughout transportation and during a stop, the present invention further comprises a lip 30. The lip 30 is fixed adjacent to the stopper plate 28 and traverses along the stopper plate 28. The plurality of chairs is supported by both the lip 30 and the stopper plate 28 so that the plurality of chairs does not tilt forwards or backwards as the lip 30 is positioned adjacent to the first panel face 31.

In order for the platform 1 to be maneuvered without a user having to uncomfortable reach for the platform 1, the extended handle 21 comprises a panel 24 and a hand-receiving slot 25, seen in FIG. 1, FIG. 2, FIG. 3, and FIG. 6. The panel 24 allows the platform 1, and consequently the plurality of folding chairs and the plurality of folding tables, to be maneuvered while standing and walking. The hand-receiving slot 25 allows the user to grasp onto the panel 24 without damaging the structural integrity of the panel 24. The panel 24 is hingedly connected with the elongated base panel 2 so that the extended handle 21 may be retracted and rested onto the elongated base panel 2 while not in use. More specifically, a free end 23 of the extended handle 21 is positioned opposite to the fixed end 22 of the extended handle 21, across the panel 24. The hand-receiving slot 25 is positioned adjacent to the free end 23, therefore easily accessible by the user. The user may firmly grasp onto the panel 24 without grasping along the edges of the panel 24 as the hand-receiving slot 25 traverses through the panel 24.

Although the invention has been explained in relation to its preferred embodiment, it is to be understood that many other possible modifications and variations can be made without departing from the spirit and scope of the invention as hereinafter claimed.

What is claimed is:

1. A cart for folding chairs and folding tables comprising:
   a platform;
   a plurality of first cleats;
   a plurality of second cleats;
   a plurality of wheels;
   an extended handle;
   the platform comprising an elongated base panel and a frame;
   the frame being positioned adjacent to a second panel face of the elongated base panel;
   a first panel face of the elongated base panel being positioned opposite to the second panel face;
   the frame being perimetrically fixed around the elongated base panel;
   the plurality of first cleats and the plurality of second cleats being positioned opposite each other about the frame;
   the plurality of first cleats and the plurality of second cleats being externally positioned to the frame;
   the plurality of first cleats and the plurality of second cleats being laterally mounted to the frame;
   the plurality of wheels being mounted onto the second panel face;
   the plurality of wheels traversing out of the frame; and
   the extended handle being hingedly mounted onto the first panel face;
   a stopper plate;
   the elongated base panel comprising a first widthwise edge and a second widthwise edge;
   a fixed end of the handle being positioned adjacent to the first widthwise edge;
   the stopper plate being positioned adjacent to the second widthwise edge;
   the stopper plate being positioned perpendicular to the elongated base panel; and
   the stopper plate being laterally mounted to the frame.

2. The cart for folding chairs and folding tables as claimed in claim 1 comprising:
   a fixed end of the extended handle being positioned adjacent to a first widthwise edge of the elongated base panel;
   the first widthwise edge being positioned between the plurality of first cleats and the plurality of second cleats; and
   a rotation axis of the hinged connection between the extended handle and the elongated base panel being positioned parallel to the first widthwise edge.

3. The cart for folding chairs and folding tables as claimed in claim 1 comprising:
   a plurality of first sockets; and
   each of the plurality of first sockets being configured in between a corresponding pair of cleats from the plurality of first cleats.

4. The cart for folding chairs and folding tables as claimed in claim 1 comprising:
   a plurality of second sockets; and
   each of the plurality of second sockets being configured in between a corresponding pair of cleats from the plurality of second cleats from the plurality of second cleats.

5. The cart for folding chairs and folding tables as claimed in claim 1 comprising:
   the elongated base panel comprising a first widthwise edge, a second widthwise edge, a first lengthwise edge, and a second widthwise edge;
   the first widthwise edge, the second widthwise edge, the first lengthwise edge, and the second lengthwise edge being arranged into a rectangular configuration;
   the plurality of first cleats being distributed along the first lengthwise edge; and
   the plurality of second cleats being distributed along the second lengthwise edge.

6. The cart for folding chairs and folding tables as claimed in claim 1 comprising:
   each of the plurality of first cleats and each of the plurality of second cleats each comprise a cleat body;
   the cleat body comprising a first lateral surface, a second lateral surface, a third lateral surface and a fourth lateral surface;
   the first lateral surface, the second lateral surface, the third lateral surface, and the fourth lateral surface being oriented perpendicular with the frame;
   the first lateral surface and the second lateral surface being positioned opposite each other about the cleat body;
   the third lateral surface and the fourth lateral surface being positioned opposite each other about the cleat body;

the third lateral surface and the fourth lateral surface being positioned in between the first lateral surface and the second lateral surface;

the fourth lateral surface being oriented towards the elongated base panel;

the first lateral surface and the second lateral surface being positioned parallel with each other;

the third lateral surface being positioned perpendicular with the first lateral surface and the second lateral surface;

the fourth lateral surface being oriented at a first acute angle with the first lateral surface; and the fourth lateral surface being oriented at an obtuse angle with the second lateral surface.

7. The cart for folding chairs and folding tables as claimed in claim 6 comprising:

the frame comprising a first widthwise wall and a second widthwise wall;

the first widthwise wall and the second widthwise wall being positioned parallel and opposite to each other about the frame;

the first widthwise wall and the second widthwise wall being positioned perpendicular to the elongated base panel;

a fixed end of the extended handle being positioned adjacent to the first widthwise wall; and the fourth lateral surface being oriented at a second acute angle with the first widthwise wall.

8. The cart for folding chairs and folding tables as claimed in claim 1 comprising:

the plurality of wheels comprising a pair of first swivel wheels and a pair of second fixed wheels;

the elongated base panel comprise a first widthwise edge and a second widthwise edge;

the pair of first swivel wheels being positioned adjacent with the first widthwise edge;

the pair of second fixed wheels being positioned adjacent with the second widthwise edge;

the pair of first swivel wheels being positioned offset from each other;

the pair of second fixed wheels being positioned offset from each other; and a fixed end of the extended handle being positioned adjacent to the first widthwise edge.

9. The cart for folding chairs and folding tables as claimed in claim 1 comprising:

a circumference for each of the plurality of wheels being greater than a height of the frame.

10. The cart for folding chairs and folding tables as claimed in claim 1 comprising:

a length of the stopper plate being positioned parallel to the second widthwise edge; and the length of the stopper plate being longer than the second widthwise edge.

11. The cart for folding chairs and folding tables as claimed in claim 1 comprising:

a lip;

the lip being fixed adjacent to the stopper plate;

the lip traversing along the stopper plate; and the lip being positioned adjacent to the first panel face.

12. The cart for folding chairs and folding tables as claimed in claim 1 comprising:

the extended handle comprising a panel and a hand-receiving slot;

the panel being hingedly connected with the elongated base panel;

a free end of the extended handle being positioned opposite to a fixed, across the panel;

the hand-receiving slot being positioned adjacent to the free end; and the hand-receiving slot traversing through the panel.

13. A cart for folding chairs and folding tables comprising:

a platform;

a plurality of first cleats;

a plurality of second cleats;

a plurality of wheels;

an extended handle;

a plurality of first sockets;

a plurality of second sockets;

the platform comprising an elongated base panel and a frame;

the elongated base panel comprising a first widthwise edge, a second widthwise edge, a first lengthwise edge, and a second widthwise edge;

the frame being positioned adjacent to a second panel face of the elongated base panel;

a first panel face of the elongated base panel being positioned opposite to the second panel face;

the frame being perimetrically fixed around the elongated base panel;

the plurality of first cleats and the plurality of second cleats being positioned opposite each other about the frame;

the plurality of first cleats and the plurality of second cleats being externally positioned to the frame;

the plurality of first cleats and the plurality of second cleats being laterally mounted to the frame;

the plurality of wheels being mounted onto the second panel face;

the plurality of wheels traversing out of the frame;

the extended handle being hingedly mounted onto the first panel face;

each of the plurality of first sockets being configured in between a corresponding pair of cleats from the plurality of first cleats;

each of the plurality of second sockets being configured in between a corresponding pair of cleats from the plurality of second cleats from the plurality of second cleats;

the first widthwise edge, the second widthwise edge, the first lengthwise edge, and the second lengthwise edge being arranged into a rectangular configuration;

the plurality of first cleats being distributed along the first lengthwise edge; and the plurality of second cleats being distributed along the second lengthwise edge.

14. The cart for folding chairs and folding tables as claimed in claim 13 comprising:

a fixed end of the extended handle being positioned adjacent to a first widthwise edge of the elongated base panel;

the first widthwise edge being positioned between the plurality of first cleats and the plurality of second cleats; and a rotation axis of the hinged connection between the extended handle and the elongated base panel being positioned parallel to the first widthwise edge.

15. The cart for folding chairs and folding tables as claimed in claim 13 comprising:

each of the plurality of first cleats and each of the plurality of second cleats each comprise a cleat body;

the cleat body comprising a first lateral surface, a second lateral surface, a third lateral surface and a fourth lateral surface;
the frame comprising a first widthwise wall and a second widthwise wall;
the first lateral surface, the second lateral surface, the third lateral surface, and the fourth lateral surface being oriented perpendicular with the frame;
the first lateral surface and the second lateral surface being positioned opposite each other about the cleat body;
the third lateral surface and the fourth lateral surface being positioned opposite each other about the cleat body;
the third lateral surface and the fourth lateral surface being positioned in between the first lateral surface and the second lateral surface;
the fourth lateral surface being oriented towards the elongated base panel;
the first lateral surface and the second lateral surface being positioned parallel with each other;
the third lateral surface being positioned perpendicular with the first lateral surface and the second lateral surface;
the fourth lateral surface being oriented at a first acute angle with the first lateral surface;
the fourth lateral surface being oriented at an obtuse angle with the second lateral surface;
the first widthwise wall and the second widthwise wall being positioned parallel and opposite to each other about the frame;
the first widthwise wall and the second widthwise wall being positioned perpendicular to the elongated base panel;
a fixed end of the extended handle being positioned adjacent to the first widthwise wall; and
the fourth lateral surface being oriented at a second acute angle with the first widthwise wall.

16. The cart for folding chairs and folding tables as claimed in claim 13 comprising:
the plurality of wheels comprising a pair of first swivel wheels and a pair of second fixed wheels;
the elongated base panel comprise a first widthwise edge and a second widthwise edge;
the pair of first swivel wheels being positioned adjacent with the first widthwise edge;
the pair of second fixed wheels being positioned adjacent with the second widthwise edge;
the pair of first swivel wheels being positioned offset from each other;
the pair of second fixed wheels being positioned offset from each other; and
a fixed end of the extended handle being positioned adjacent to the first widthwise edge.

17. The cart for folding chairs and folding tables as claimed in claim 13 comprising:
a circumference for each of the plurality of wheels being greater than a height of the frame.

18. The cart for folding chairs and folding tables as claimed in claim 13 comprising:
a stopper plate;
a lip;
the elongated base panel comprising a first widthwise edge and a second widthwise edge;
a fixed end of the handle being positioned adjacent to the first widthwise edge;
the stopper plate being positioned adjacent to the second widthwise edge;
the stopper plate being positioned perpendicular to the elongated base panel;
the stopper plate being laterally mounted to the frame;
a length of the stopper plate being positioned parallel to the second widthwise edge;
the length of the stopper plate being longer than the second widthwise edge;
the lip being fixed adjacent to the stopper plate;
the lip traversing along the stopper plate; and
the lip being positioned adjacent to the first panel face.

19. The cart for folding chairs and folding tables as claimed in claim 13 comprising:
the extended handle comprising a panel and a hand-receiving slot;
the panel being hingedly connected with the elongated base panel; and
a free end of the extended handle being positioned opposite to a fixed, across the panel.

* * * * *